US011632815B2

(12) United States Patent
Ahmed et al.

(10) Patent No.: US 11,632,815 B2
(45) Date of Patent: Apr. 18, 2023

(54) INFORMATION HANDLING SYSTEM AND KEYBOARD DUAL MODE PAIRING

(71) Applicant: Dell Products L.P., Round Rock, TX (US)

(72) Inventors: Sajjad Ahmed, Austin, TX (US); Jace W. Files, Round Rock, TX (US); Karthikeyan Krishnakumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 17/315,912

(22) Filed: May 10, 2021

(65) Prior Publication Data

US 2022/0361266 A1 Nov. 10, 2022

(51) Int. Cl.
*H04W 76/11* (2018.01)
*H04W 12/06* (2021.01)
*H04W 76/14* (2018.01)
*G06F 3/04886* (2022.01)
*H02J 7/00* (2006.01)
*G06F 9/4401* (2018.01)
*G06F 1/26* (2006.01)

(52) U.S. Cl.
CPC ............ *H04W 76/14* (2018.02); *G06F 1/266* (2013.01); *G06F 3/04886* (2013.01); *G06F 9/442* (2013.01); *H02J 7/0048* (2020.01)

(58) Field of Classification Search
CPC . H04W 76/14; H04W 76/11; H04W 12/0471; H04W 12/06; G06F 1/266; G06F 3/04886; G06F 9/442; H02J 7/0048; H04B 3/544
See application file for complete search history.

(56) References Cited

U.S. PATENT DOCUMENTS

| 10,733,115 | B2 | 8/2020 | Tan et al. |
| 10,860,209 | B1 * | 12/2020 | Sethi ............... G06F 3/0482 |
| 2005/0085934 | A1 | 4/2005 | Jin |
| 2007/0032195 | A1 | 2/2007 | Kurisko et al. |
| 2009/0112339 | A1 | 4/2009 | Huang et al. |
| 2011/0126005 | A1 | 5/2011 | Carpenter et al. |

(Continued)

FOREIGN PATENT DOCUMENTS

EP       2148262 A2 *  1/2010  ............ G06F 3/023

*Primary Examiner* — Andrew Wendell

(74) *Attorney, Agent, or Firm* — Zagorin Cave LLP; Robert W. Holland

(57) ABSTRACT

An information handling system and keyboard automatically coordinate wireless pairing when the keyboard couples to the information handling system to interface contacts exposed at the information handling system housing and the keyboard. The information handling system retrieves an identifier of the keyboard through a contact, determines if the keyboard is already paired, and if not initiates wireless pairing with a command through the contact. A pairing key is provided from the keyboard to the information handling system through the contact and applied by the information handling system to complete pairing. A confirm code is communicated through the contact to the keyboard for communication back to the information handling system by wireless signals. The contacts provide a charging path to charge the keyboard when coupled to the information handling system.

17 Claims, 3 Drawing Sheets

(56) References Cited

U.S. PATENT DOCUMENTS

| | | | |
|---|---|---|---|
| 2011/0167181 A1* | 7/2011 | Minoo | G06F 1/266 |
| | | | 710/73 |
| 2013/0031377 A1 | 1/2013 | Sultenfuss et al. | |
| 2014/0055387 A1* | 2/2014 | Yeh | G06F 21/31 |
| | | | 345/173 |
| 2014/0075075 A1 | 3/2014 | Morrill et al. | |
| 2014/0273845 A1 | 9/2014 | Russell et al. | |
| 2014/0307607 A1 | 10/2014 | Clark et al. | |
| 2014/0378055 A1 | 12/2014 | Pal et al. | |
| 2015/0105014 A1 | 4/2015 | Kulavik et al. | |
| 2016/0285524 A1 | 9/2016 | Liu et al. | |
| 2018/0020829 A1* | 1/2018 | Vier | G06F 1/1626 |
| | | | 345/169 |
| 2020/0004301 A1* | 1/2020 | Cai | G06F 1/1669 |
| 2020/0374954 A1* | 11/2020 | Chen | H04W 4/80 |
| 2021/0286409 A1* | 9/2021 | Vajravel | G06F 1/1669 |
| 2021/0373675 A1* | 12/2021 | Ansari | G06F 3/0216 |

\* cited by examiner

INFORMATION HANDLING SYSTEM AND KEYBOARD DUAL MODE PAIRING

BACKGROUND OF THE INVENTION

Field of the Invention

The present invention relates in general to the field of information handling systems and wireless peripherals, and more particularly to an information handling system and keyboard dual mode pairing.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Recently, dual screen information handling systems have come to market that replace the keyboard of a convertible system with a second display. In the clamshell configuration, the second display presents an image of a keyboard that accepts touch inputs as key inputs. When the housing rotates 180 degrees to a planar configuration, a tablet is provided that offers a larger viewing area than a conventional convertible system with visual images presented across the displays of both housing portions. Although a virtual keyboard presented at a touchscreen display offers a convenient input interface, dual screen systems typically also interface with a peripheral keyboard that accepts keyed inputs and communicates the inputs through a wireless interface, such as Bluetooth. Typically, the wireless communication is defined by a pairing process that exchanges identifiers between the information handling system and keyboard, such as MAC addresses, and secures the wireless interface with a security key. For example, during the pairing process the information handling system presents a security code at display that the end user types into the keyboard to complete a securing pairing connection. Once pairing is complete, the information handling system and keyboard will automatically establish a wireless interface, such as through an automated advertisement and discovery process.

One difficulty that can arise with wireless peripheral interfaces is that a display presentation may be impractical and even not possible in some situations. For example, at manufacture and before shipping an information handling system to an end user, a pre-established Bluetooth pairing is typically desired so that the system is ready to use on arrival. In a manufacture environment with a large number of wireless peripherals, identifying the correct peripheral to pair with an information handling system is often difficult. A similar difficulty can arise in an enterprise work environment where a large number of similar systems are deployed. The difficulty is compounded where a display presentation of a key during pairing is not practical, such as when the system housing is closed, docked or in a low power mode so that the display is inactive or inaccessible.

SUMMARY OF THE INVENTION

Therefore, a need has arisen for a system and method which automatically pairs a keyboard and information handling system.

In accordance with the present invention, a system and method are provided which substantially reduce the disadvantages and problems associated with previous methods and systems for pairing a keyboard and information handling system. Pairing of the keyboard and information handling system is coordinated with communication through contacts that align when the keyboard couples to the information handling system and completed with wireless signals in an automated manner.

More specifically, an information handling system processes information with a processor and memory disposed in a portable housing and communicates information with a peripheral keyboard through wireless signals, such as with a BLUETOOTH protocol. The keyboard couples to a bottom surface of the information handling system housing to align contacts of the keyboard with contacts of the housing. An embedded controller of the information handling system communicates with a processing resource of the keyboard through the contacts to determine if the keyboard and information handling system are paired. If not paired, the information handling system commands pairing by the keyboard through the contacts, and the keyboard responds by communicating a pairing code through the contacts to the embedded controller. The embedded controller coordinates pairing between a radio of the information handling system and a radio of the keyboard by sending the pair code as a wireless signal in response to a keyboard pairing request. At completion of the pairing, the embedded controller communicates a confirm code to the keyboard through the contacts, which the keyboard returns through a wireless signal to confirm the pairing. At confirmation of an existing pairing or completion of pairing, the contacts provide power from the information handling system to the keyboard for charging the keyboard battery. In one embodiment, once charging is complete, power is shut off at the information handling system.

The present invention provides a number of important technical advantages. One example of an important technical advantage is that an information handling system and keyboard are automatically paired by coupling the keyboard to the information handling system. A transfer of pairing information through physical contacts allows the information handling system to determine if pairing is already established and, if not, to complete pairing with the information handling system powered down and without end user interactions. In particular, the automated pairing simplifies end user interactions in areas where a large number of wireless devices are present, such as at manufacture and packaging of the information handling system and in enterprise environments where a large number of similar peripherals may be in use. A sensor in the information handling system detects coupling of the keyboard to apply power at an embedded controller for managing the pairing and a charge of the keyboard so that the end user can count on having a paired keyboard when removed from the information handling system. After charging is complete, power may be removed from the embedded controller to reduce power dissipation at the system when stored in an off state.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system automatically coordinates pairing with a keyboard through aligned contacts that provide communication and charging when the keyboard couples to the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
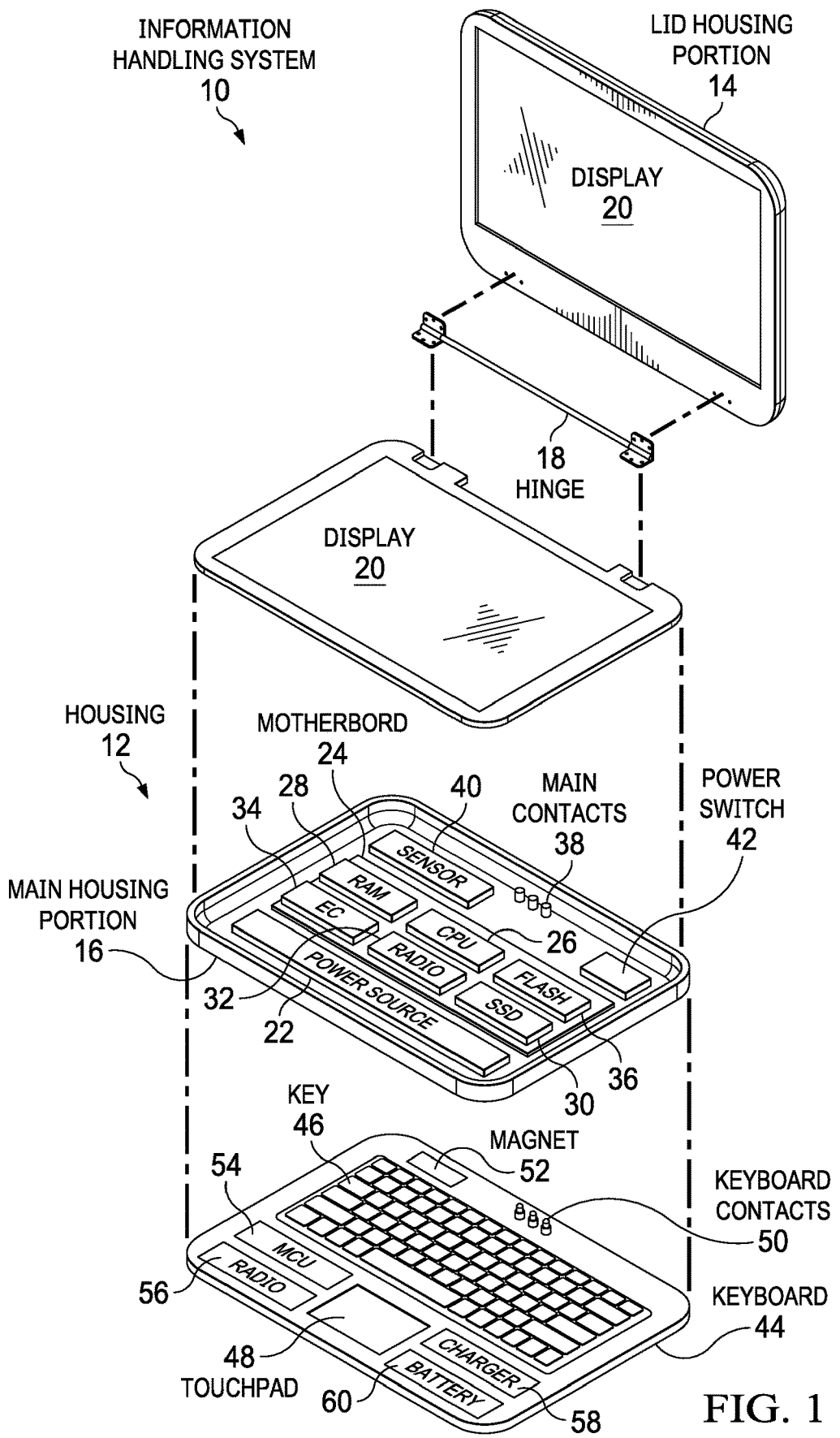
FIG. 1 depicts an exploded perspective view of an information handling system and keyboard that automatically pair when coupled to each other.

Referring now to FIG. 1, an exploded perspective view depicts an information handling system 10 and keyboard 44 that automatically pair when coupled to each other. In the example embodiment, information handling system 10 has a portable configuration built in a housing 12 having a lid portion 14 rotationally coupled to a main portion 16 by a hinge 18. Each of the housing portions has a display 20 disposed over it to present information as visual images. In various embodiments, displays 20 may be separate LCD or OLED panels, or a single foldable OLED display film may be disposed across both housing portions to fold at hinge 18. Processing components disposed in main housing portion 16 cooperate to process information with power from an internal power source, such as a battery or power supply that accepts external power. A motherboard 24 couples to main housing portion 16 to interface the processing components. A central processing unit (CPU) 26 executes instructions to process information, such as an operating system and applications. A random access memory (RAM) 28 interfaces with CPU 26 to store the instructions and information for access during execution. A solid state drive (SSD) 30 provides non-transitory memory that stores information during power down. A radio 32 provides wireless communication for the information handling system to interact with external devices, such as peripherals and networks. An embedded controller 34 manages physical operating conditions at information handling system 10, such as application of power, thermal constraints and interactions with peripheral devices. For example, embedded controller 34 may execute code stored in flash memory 36, such as firmware or driver code retrieved from SSD 30. In various embodiments, other processing components may be included, such as separate graphics processor, communication ports, cooling fans and other devices that aid in processing information. In the example embodiment, displays 20 include a touchscreen capability that provides an integrated input device, such as by presenting a virtual keyboard that accepts end user typing inputs. In addition, a peripheral keyboard 44 may interface with information handling system 10 to provide an input device with physical keys.

In the example embodiment, keyboard 44 includes keys 46 and a touchpad 48 that accept end user touches as inputs. Keyboard 44 couples to a bottom surface of main housing portion 16 to align main contacts 38 of information handling system 10 with keyboard contacts 50 of keyboard 44. In the example embodiment, three opposing contacts include one for communicating information, one for charging and one for ground. For instance, the contacts may be pogo pins that bias towards each other, magnet contacts, or may be held together by the coupling of keyboard 44 to main housing portion 16, other types of contact pads or contact rings, a combination of pogo pins and contact pads, or a standardized port having a pin re-purposed to perform pairing, such as a USB connector and port. A processing resource 54, such as an MCU, within keyboard 44 executes code stored in integrated flash memory to manage communications by a radio 56 of wireless signals. For instance, processing resource 54 and radio 56 may be a BLUETOOTH or BLE system on chip (SOC) that communicates key inputs to radio 32 of information handling system 10 using a BLUETOOTH or BLE protocol. A charger 58 interfaced with keyboard contacts 50 accepts charge from information handling system 10 for battery 60, which powers keyboard 44. A sensor 44 of information handling system 10 aligns with a magnet 52 of keyboard 44 to detect at information handling system 10 when keyboard 44 couples to the bottom of main housing portion 16. For example, sensor 40 may be a Hall sensor that sends a signal to a GPIO pin of embedded controller 34. Alternatively, main contacts 38 may include a moving pogo pin that detects contact, a push button or other type of sensor that detects coupling of keyboard 44 to information handling system. In the example embodiment, the sensor includes a magnetic power switch 42 that turns on power to embedded controller 34 when keyboard 44 couples into position so that the contacts are aligned.

In the example embodiment, when the keyboard couples to the information handling system and is detected by the sensor, embedded controller 34 executes firmware to initiate, complete and confirm pairing of radios 32 and 56 so that keyboard 44 "just works" next time it releases from information handling system 10. At detection of contact by the main and keyboard contacts, communication is established between the information handling system and keyboard through the communication contact, and a charge may be applied across the charge contact for charging the battery, such as in response to coordination performed through the communication contact using a 1-wire protocol. The 1-wire protocol supports bi-directional communication in a number of different manners, such as with an embedded clock and frequency or amplitude modulation. In one alternative embodiment, a power pin may be repurposed to support communication, such as inserting a clock or supporting an I2C or other protocol. In one example embodiment, communication across the communication contact is first secured with a public private key exchange, such as a Diffie Hellman. After secure communication is established, embedded controller 34 interfaces with processing resource 54 to initiate pairing of radios 32 and 56. When keyboard 44 couples to information handling system 10, information handling system 10 may be powered on so that embedded controller 34 has full access to the processing components. In many instances, information handling system 10 may be powered down and in a closed position so that power is not available to embedded controller 34 and displays 20 are hidden. When information handling system 10 is powered off, activation of power switch 42 provides power to embedded controller 34, which can then power up those components that need to perform charging and pairing. After pairing is complete, charging of keyboard 44 may continue until complete, after which embedded controller may turn off power to information handling system, such as with a separate power switch or a command to power switch 42. This power management allows pairing and charging with minimal power drain and then storage of information handling system 10 in a hard off state that does not drain power source 22. Alternatively, embedded controller 34 may power down to a soft state with power remaining available through power switch 42, which can support a transition to an on state at removal of keyboard from information handling system 10.

Embedded controller 34 manages pairing of radios 32 and 56 by transferring information across the communication contacts in the place of end user inputs. For instance, embedded controller 34 first retrieves pairing information from keyboard 44 to determine if keyboard 44 is already paired, such as the BLE MAC addresses stored in processing resource 54 flash memory of paired devices. If both information handling system 10 and keyboard 44 indicate that pairing is complete, embedded controller 34 completes charging and powers down. In some instances, information handling system 10 may include pairing information with multiple keyboards so that radio 32 stores pairing information of keyboard 44 while coupled in place and remains configured to establish a connection after a different peripheral keyboard is used. If either information handling system 10 or keyboard 44 is not paired, embedded controller 34 commands keyboard 44 to enter pairing mode, such as BLUETOOTH or BLE advertisement, and to send to embedded controller 34 a pairing code to use with wireless communication to complete pairing, such as is defined by BLUETOOTH BR/EDR Secure Simple Pairing Out-of-Band data in accordance with BLUETOOTH CORE specification Volume 3, Part C, Section 5.2.2.7. In general terms, the pairing code is typically presented at a display of the information handling system during advertisement and pairing operations so that an end user can type the code into the keyboard. Instead, embedded controller 34 passes the pairing code to radio 32 to respond to keyboard 44 during wireless pairing. Once the pairing code is passed to the keyboard and pairing is complete, embedded controller 34 generates a complete code that is communicated through the communication contact and sent back by keyboard 44 through a wireless signal to confirm that the correct peripheral is paired, such as by sending the confirm code as if typed at keyboard 44. When pairing completes in this automated manner with keyboard 44 coupled to information handling system 10, power at keyboard 44 may then be immediately shut off rather than waiting for a power down timeout based on inactivity.

Figure 2:
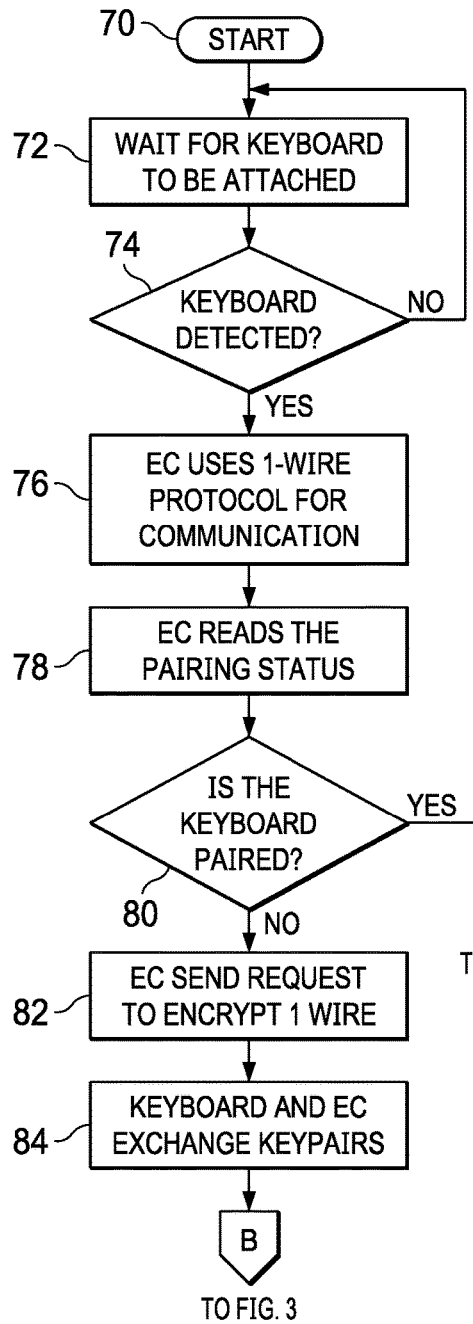
FIG. 2 depicts a flow diagram of a process for determining if an information handling system and keyboard are paired at coupling of the keyboard to the information handling system.

Referring now to FIG. 2, a flow diagram depicts a process for determining if an information handling system and keyboard are paired at coupling of the keyboard to the information handling system. The process starts at step 70 and monitors at step 72 for the keyboard to attach to the information handling system. At step 74, when attachment is detected, the process continues to step 76 to establish 1-wire protocol communication protocol transfer of information through the information handling system and keyboard contacts. Using wired communications through the contacts, the embedded controller reads the pairing status of the keyboard at step 78. At step 80, a determination is made of whether the keyboard and information handling system are already paired. If so the process ends at step 116 of FIG. 4. If not, the process continues to step 82 for the embedded controller to send a request to encrypt communications through the 1-wire protocol. At step 84 the keyboard and embedded controller exchange public private keys to initiate encryption. The process then continues at FIG. 3.

Figure 3:
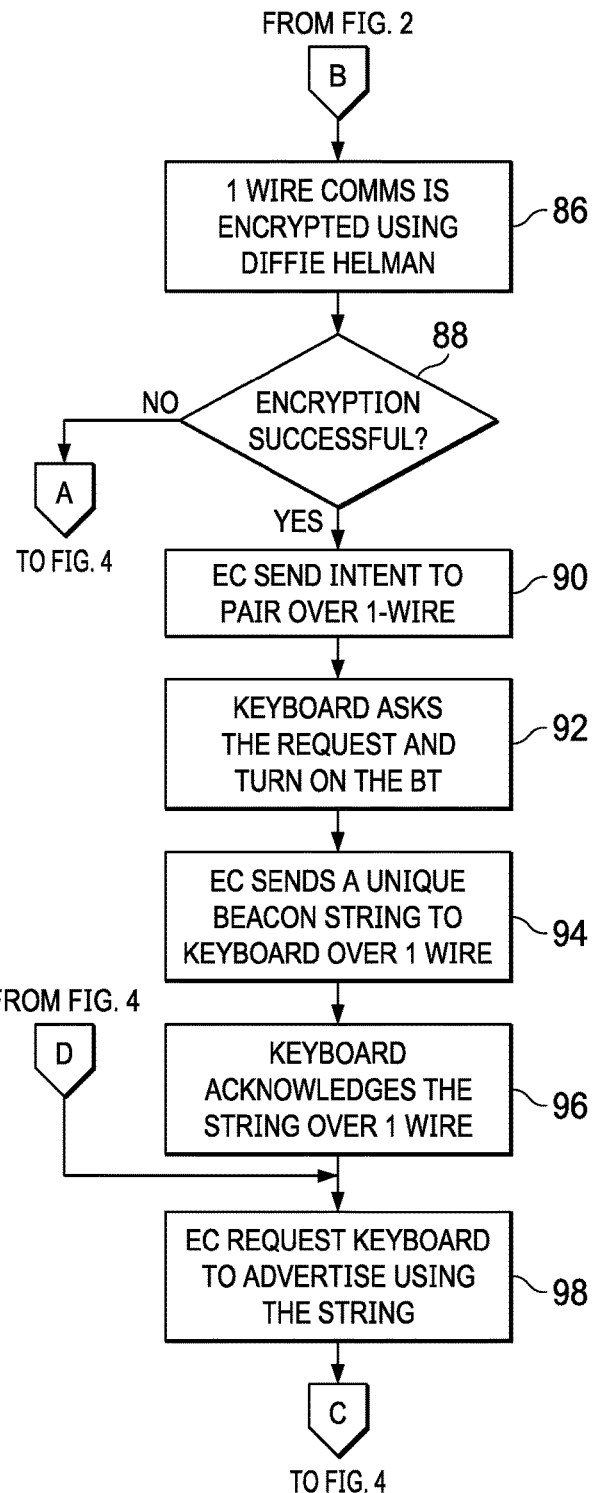
FIG. 3 depicts a flow diagram of a process for coordinating pairing of an information handling system and keyboard through physical contacts.

Referring now to FIG. 3, a flow diagram of a process for coordinating pairing of an information handling system and keyboard through physical contacts. The process starts at step 86 by completing encryption through the 1-wire protocol using Diffie Hellman. At step 88 a determination is made of whether encryption succeeded and, if not, the process ends at step 116. If encryption succeeds, the process continues to step 90 where the embedded controller sends an intent to pair command through the 1-wire interface. At step 92, the keyboard acknowledges the request and turns on the BLUETOOTH radio. At step 94, the embedded controller sends a unique beacon string to the keyboard over the 1-wire protocol. At step 96, the keyboard acknowledges the string over the 1-wire protocol. At step 98, the embedded controller requests the keyboard to advertise using the unique string. The process then continues at FIG. 4.

Figure 4:
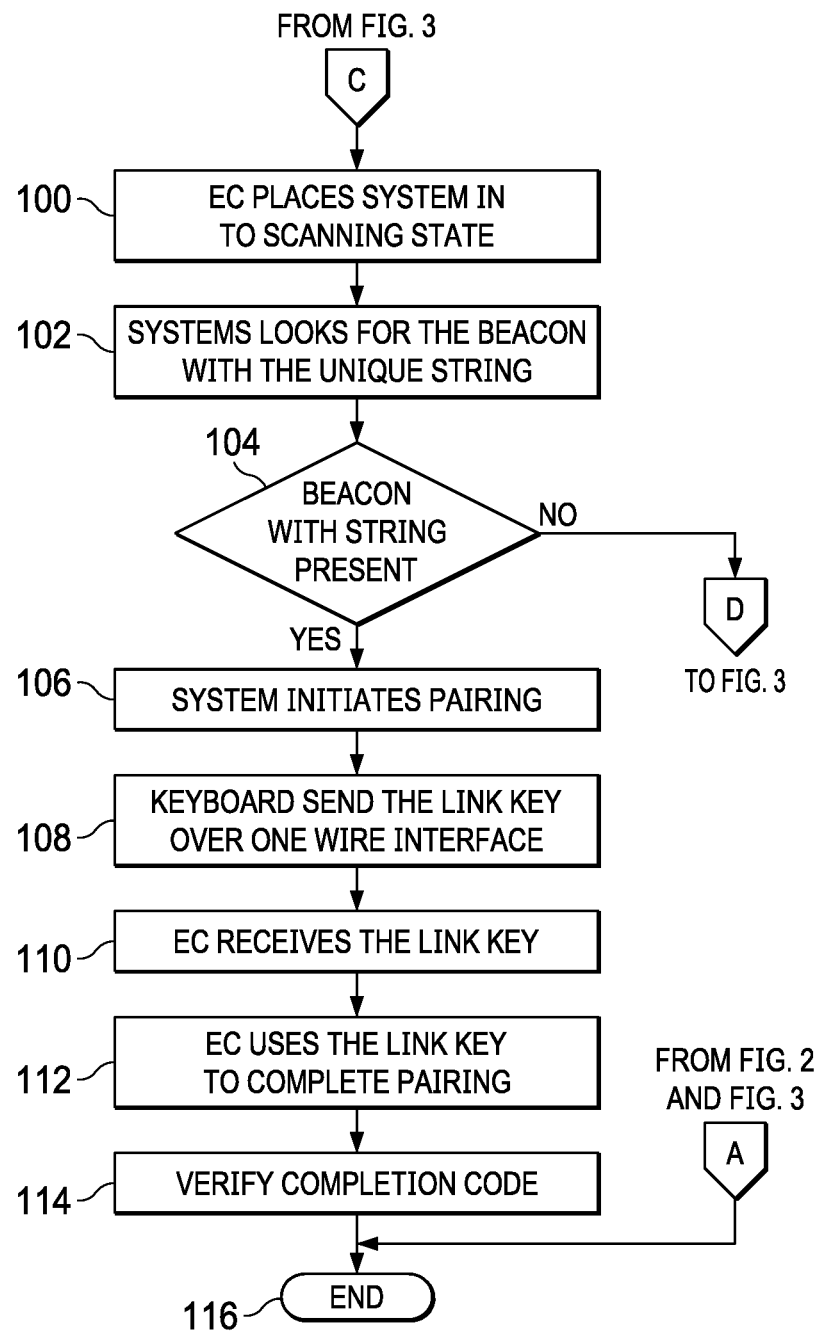
FIG. 4 depicts a flow diagram of a process for completion of pairing of an information handling system and keyboard with confirmation through physical contacts.

Referring now to FIG. 4, a flow diagram of a process for completion of pairing of an information handling system and keyboard with confirmation through physical contacts. At step 100, the embedded controller places the information handling system radio into a scanning state to establish a wireless interface with the keyboard. At step 102, the information handling system radio listens for an advertisement having the beacon unique string. At step 104 a determination is made of whether the advertisement is detected and, if not, the process returns to step 98 of FIG. 3. If at step 104 the advertisement is detected, the process continues to step 106 to initiate pairing, such as with the BLUETOOTH protocol. At step 108, the keyboard sends a pairing link key over the 1-wire interface, such as the pairing link key that an end user would normally input when presented at a display during pairing. At step 110, the embedded controller receives the pairing link key and at step 112 uses the link key to complete the pairing process. Once pairing is complete, at step 114 the embedded controller sends a confirm code to the keyboard through the 1-wire protocol that the keyboard communicates back as a wireless signal to the information handling system to confirm successful pairing. The process ends at step 116 with the system completing keyboard charging and then powering down.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions to process information;
   a memory disposed in the housing and interfaced with the processor, the memory operable to store the instructions and information;
   an embedded controller disposed in the housing and interfaced with the processor, the embedded controller operable to execute instructions that manage power applied to the processor and that manage peripheral device inputs to the processor;
   a non-transient memory interfaced with the embedded controller and storing embedded controller instructions;
   a main radio operable to communicate information with the peripheral device as wireless signals;
   a keyboard having plural keys to accept inputs, a keyboard radio to communicate information with the main radio as wireless signals, a processing resource operable to execute instructions, a non-transient memory to store keyboard instructions, and one or more exposed keyboard contacts interfaced with the processing resource; and
   one or more main contacts disposed at an exterior of the housing positioned to align with the keyboard contacts;
   wherein the keyboard instructions execute on the processing resource and the embedded controller instructions execute on the embedded controller to;
   communicate keyboard identifier information to the embedded controller through the one or more main contacts and keyboard contacts;
   when the keyboard radio and main radio are unpaired, command from the embedded controller initiation of pairing by the keyboard radio;
   in response to the pairing, communicate from the keyboard to the embedded controller a pairing key; and
   complete pairing at the main radio by communicating the pairing key to the keyboard radio with a wireless signal;
   wherein:
   the embedded controller instructions further generates a confirm code at pairing and communicates the confirm code to the keyboard through the one or more main contacts; and
   the keyboard instructions further communicate the confirm code through the keyboard radio to the main radio.

2. The information handling system of claim 1 further comprising:
   a power source interfaced with the main contacts;
   wherein the embedded controller instructions command power from the power source to the main contacts when in communication with the keyboard contacts.

3. The information handling system of claim 2 further comprising:
   a battery disposed in the keyboard;
   a charger disposed in the keyboard and interfaced with the battery and the keyboard contacts, the charger operable to charge the battery with power received at the keyboard contacts.

4. The information handling system of claim 3 further comprising:
   a sensor disposed in the housing and operable to detect the main and keyboard contacts aligned to communicate information; and
   a power switch interfaced with the sensor and operable to apply power to the embedded controller to execute the embedded controller instructions.

5. The information handling system of claim 4 wherein the embedded controller interfaces with the power switch and the embedded controller instructions are operable to cut power off from the embedded controller at a predetermined charge of the keyboard battery.

6. The information handling system of claim 4 wherein the sensor comprises:
   a magnet disposed in the keyboard; and
   a Hall sensor disposed in the housing and interfaced with the embedded controller.

7. The information handling system of claim 4 wherein the sensor comprises:
   a magnet disposed in the keyboard; and
   magnetic activation device in the power switch.

8. The information handling system of claim 1 wherein:
   each of the one or more main contacts and one or more keyboard contacts comprise a power contact, a ground contact and one communication contact.

9. A method for interfacing an information handling system and keyboard, the method comprising:
   detecting an interface between main contacts integrated in the information handling system and keyboard contacts integrated in the keyboard;
   retrieving an identifier of the keyboard to the information handling system communicated through one or more of the keyboard contacts to one or more of the information handling system contacts;
   comparing the identifier with stored identifiers to determine if the keyboard is paired with the information handling system;

when the keyboard is not paired, commanding from the information handling system through the one or more keyboard contacts and the one or more information handling system contacts for the keyboard to enter pairing;

communicating from the keyboard to the information handling system through the one or more keyboard contacts and the one or more information handling system contacts a pairing code;

communicating a confirm code from the information handling system to the keyboard through the one or more information handling system contacts and the one or more keyboard contacts; and communicating the confirm code from the keyboard to the information handling system with wireless signals after the pairing; and pairing the keyboard and information handling system through wireless signals by communicating the pairing code from the information handling system to the keyboard.

10. The method of claim 9 further comprising:
detecting a first predetermined charge state of a battery disposed in the keyboard; and
in response to detecting the first predetermined charge state, transferring power from the information handling system to the keyboard through the one or more information handling system contacts and the one or more keyboard contacts.

11. The method of claim 10 further comprising:
detecting a second predetermined charge state of the battery; and
in response to detecting the second predetermined charge state, turning off power at the information handling system.

12. The method of claim 9 wherein the detecting an interface between main contacts integrated in the information handling system and keyboard contacts integrated in the keyboard further comprises:
detecting a magnet integrated in the keyboard with a Hall sensor integrated in the information handling system; and
in response to detecting the magnet, sending a signal to an embedded controller of the information handling system.

13. The method of claim 9 wherein detecting an interface between main contacts integrated in the information handling system and keyboard contacts integrated in the keyboard further comprises:
closing a magnetic power switch integrated in the information handling system with a magnet integrated in the keyboard; and
applying power to the embedded controller from the magnetic power switch.

14. The method of claim 9 further comprising:
exchanging a public private key between the information handling system and keyboard through the information handling system and keyboard contacts; and
encrypting the pairing code and confirm code with the public private key.

15. A system for wirelessly interfacing an information handling system and a keyboard, the system comprising:
a processing resource disposed in the keyboard;
keyboard contacts interfaced with the processing resource;
an embedded controller disposed in the information handling system;
information handling system contacts interfaced with the embedded controller;
non-transient memory storing instructions that when executed on the processing resource and the embedded controller;
communicate keyboard identifier information to the embedded controller through the one or more information handling system contacts and keyboard contacts;
determine at the embedded controller whether the keyboard and information handling system are paired;
when the keyboard and information handling system are unpaired, initiate pairing of the keyboard and information handling system through wireless communication;
in response to the pairing, communicate from the keyboard to the embedded controller a pairing key through the one or more information handling system contacts and keyboard contacts;
communicate a confirm code from the information handling system to the keyboard through the one or more information handling system contacts and keyboard contacts; and
communicate the confirm code from the keyboard to the information handling system through a wireless signal; and
complete pairing at the information handling system by communicating the pairing key to the keyboard with a wireless signal.

16. The system of claim 15 wherein:
the information handling system contacts are one charge contact, one ground contact and one communication contact; and
the keyboard contacts are one charge contact, one ground contact and one communication contact.

17. The system of claim 16 wherein the instructions further exchange a public private key to encrypt the pairing key before communication from the keyboard to the information handling system.

* * * * *